United States Patent [19]

Levine

[11] Patent Number: 4,677,490

[45] Date of Patent: Jun. 30, 1987

[54] CCD IMAGER OUTPUT SIGNAL PROCESSING USING DRAIN OUTPUT SIGNAL AND WIDE-BAND SAMPLED DETECTED FLOATING-ELEMENT OUTPUT SIGNAL

[75] Inventor: Peter A. Levine, Mercer County, N.J.

[73] Assignee: RCA Corporation, Princeton, N.J.

[21] Appl. No.: 776,025

[22] Filed: Sep. 13, 1985

[51] Int. Cl.$^4$ ............................................. H04N 3/14
[52] U.S. Cl. ........................... 358/213.26; 358/213.18
[58] Field of Search .............................. 358/213, 212; 357/24 LR

[56] References Cited

U.S. PATENT DOCUMENTS

| | | | |
|---|---|---|---|
| 4,330,753 | 5/1982 | Davy | 329/50 |
| 4,435,730 | 3/1984 | Bendell et al. | 358/213 |
| 4,556,851 | 12/1985 | Levine | 358/213 |
| 4,562,475 | 12/1985 | Levine | 358/213 |
| 4,567,525 | 1/1986 | Endo et al. | 358/213 |

Primary Examiner—Gene Z. Rubinson
Assistant Examiner—Stephen Brinich
Attorney, Agent, or Firm—Eugene M. Whitacre; Allen LeRoy Limberg; James B. Hayes

[57] ABSTRACT

First and second output signals are taken from a floating element in a CCD charge transfer channel and from the terminal drain diffusion of that CCD charge transfer channel. The floating element is part of an electrometer, and the electrometer response is wide-band sampled at the CCD charge transfer channel clocking rate. Current flow through the terminal drain diffusion is sensed by the input circuit of a low 1/f noise transresistance amplifier. Continuous-frequency-spectrum low-noise output signal is generated from the low-frequency components of the transresistance amplifier response and from the high-frequency components of the processed second output signal. Subsequent filtering removes unwanted clock and aliased frequency components.

3 Claims, 3 Drawing Figures

CCD IMAGER OUTPUT SIGNAL PROCESSING USING DRAIN OUTPUT SIGNAL AND WIDE-BAND SAMPLED DETECTED FLOATING-ELEMENT OUTPUT SIGNAL

The present invention relates to the extraction of video signals from output signals of a charge-coupled device (CCD) charge transfer channel, as may be found for example in a solid-state imager.

BACKGROUND OF THE INVENTION

S. L. Bendell and P. A. Levine in their U.S. Pat. No. 4,435,730 issued Mar. 6, 1984, entitled "LOW NOISE CCD OUTPUT" and assigned to RCA Corporation describe a way to overcome the flicker noise (or 1/f noise) associated with the use of floating-element electrometers as CCD output signal stages. These floating-element electrometers sense the charge on a floating element in a CCD charge transfer channel converting the charge to an output voltage or current. The potential on the floating element, either a floating gate or a floating diffusion, has to be periodically dc-restored to provide a reference level for the voltages electrostatically induced on the element by a charge packet disposed nearby in the charge transfer channel. Floating-diffusion electrometers are favored over floating-gate electrometers, because the floating diffusion can also serve as the source electrode of the metal-oxide-semiconductor transistor used as a clamp in the dc restoration process. This reduces the capacitance associated with the floating element, to increase electrometer sensitivity in accordance with Coulomb's Law. The low-frequency components of the floating-element electrometer response are undesirably contaminated with flicker noise. Bendell and Levine overcame this problem by using a cross-over network. The cross-over network selects only the higher frequency components of the floating-element electrometer output signal as higher frequency components of the final imager output signal, and the cross-over network selects the lower frequency components of the reset drain current as the lower frequency components of the final imager output signal. The reset drain current is typically sensed using a transresistance amplifier with junction field effect transistor (JFET) in common-source amplifier configuration as input stage. The output voltage of the transresistance amplifier, provided in response to reset drain current applied at its input, tends to have poorer high frequency response than the floating-element electrometer. However, there is relatively little 1/f noise contaminating the low-frequency portion of the transresistance amplifier response.

Alternative ways to overcome 1/f noise, which allow obtaining good high frequency response are known. Correlated double sampling is perhaps the best known of these alternative ways. Other ways rely on synchronously detecting the samples of output signal from the CCD imager at a harmonic (e.g. the first harmonic) of the sampling rate.

L. N. Davy in his U.S. Pat. No. 4,330,753 issued May 18, 1982 and entitled "METHOD AND APPARATUS FOR RECOVERING SIGNAL FROM A CHARGE TRANSFER DEVICE" describes a method for obtaining what he characterizes as relatively noise-free information signals from the output stage of a charge transfer device. In the method Davy describes, the output signal from the regularly sampling electrometer stage is passed through a band-pass filter to separate double-sideband amplitude-modulation (DSB AM) sidebands flanking a harmonic of the clocking frequency of the electrometer stage. The separated sidebands are then synchronously detected using a switching demodulator operated at the harmonic of that clocking frequency. The amplitude-modulating signal is heterodyned to baseband spectrum by the switching demodulator. The baseband spectrum of the synchronously detected AM sidebands is separated from the harmonic spectra associated with it and is used as the output signal from the charge transfer device, rather than the baseband spectrum of the imager output signal, which is supressed by the band-pass filtering before synchronous detection. The method Davy describes would be effective in suppressing the 1/f noise in a floating-element electrometer stage, since 1/f noise resides principally in the baseband. It is relatively simple as compared with correlated double sampling to reduce the baseband entirely or at least up to the one or two megahertz frequencies where 1/f noise exceeds the thermal noise background.

P. A. Levine in U.S. patent application Ser. No. 590,044 filed Mar. 15, 1984, now abandoned, entitled "CCD FLOATING-ELEMENT OUTPUT STAGES PROVIDING LOW RESET NOISE WITH SINGLE SAMPLING" and assigned to RCA Corporation describes a synchronous detection of CCD imager output samples after high-pass filtering and differentiation. The synchronous detection is carried out by: sampling the filtered or differentiated response with a switch recurrently conductive at CCD imager output signal clock rate and holding the sampled response on a hold capacitor. Appropriate timing of reset pulses on the floating-element electrometer, this application teaches, reduces reset noise. The reset process in a floating-element electrometer, in which process the floating element is recurrently clamped to a fixed potential, exhibits reset noise owing to the variations in the potential left upon the floating element from one reset interval to another. Reset noise is the predominant noise in the upper-video frequencies of the output signals of charge transfer devices such as CCD imagers, typically being about 8 db larger than noise in the metal-insulator-semiconductor field-effect-transistor (MISFET) electrometer stage following a floating diffusion with 0.07 pf capacitance. At lower video frequencies flicker noise or 1/f noise predominates.

P. A. Levine in U.S. Pat. No. 4,556,851 filed Mar. 21, 1985, entitled "REDUCTION OF NOISE IN SIGNAL FROM CHARGE TRANSFER DEVICES" and assigned to RCA Corporation describes synchronous detection of CCD imager output signals using a different form of reset noise suppression. Resetting of the floating-element is to an in-channel potential, rather than to the direct potential applied to a reset drain.

Synchronous detection of these components of CCD imager output signal that are sidebands of output clock rate, in order to suppress 1/f noise, has been found to have practical problems, however. The synchronous detection is undesirably sensitive to minute variations in the phase relationship between the CCD imager output samples and the switching carrier used in the synchronous detection process. This sensitivity is evidenced in a tendency for spurious low frequency components, causing fixed-pattern shading, to appear sometimes in the video signals derived from the synchronous detector output response. This tendency is most apparent when the CCD imager is operated at low light levels.

The CCD imager output samples tend to be superposed on various low-frequency components prior to their filtering and synchronous detection. However, no amount of filtering to reject baseband frequencies eliminates the spurious low-frequency components in the synchronous detector output response, so these spurious low-frequency components are not attributable to baseband components feeding through the synchronous detector.

Similar low-frequency, fixed-pattern shading manifests itself in correlated double sampling of CCD imager output signal, when the imager is operated at low light levels. This fixed-pattern shading also seems to be a function of sampling pulse phasing. In general, systems tend to be subject to this type of fixed-pattern noise if the CCD imager output signal is not low-passed prior to sampling. So, the origins of this fixed-pattern noise appear to be in the heterodyning of the clocking noise in the CCD imager output signal, which is in the harmonic spectrum of output (C) register clocking signal, with the sampling-pulse frequencies.

The use of synchronous detection of the CCD imager output signal components that are harmonics of output clock rate has been done to suppress 1/f noise. Correlated double sampling has been done to suppress 1/f noise, also. The Bendell and Levine cross-over of imager output signals derived from the floating-element electrometer and from reset drain current sensing has been done to suppress 1/f noise, also. So, no reasons for combining the Bendell and Levine technique with synchronous detection (or with correlated double sampling) have been previously perceived, particularly inasmuch as this would introduce a complication additional to that involved with the use of synchronous detection (or correlated double sampling).

The reset drain current sensing is free of the low-frequency fixed-pattern spurious components that sometimes appear in the synchronous detector output response (or the correlated double sampler output response). This is because there is no wide-band sampling of this imager output signal. So it appears now to the inventor Levine that the use of the low-frequency components of sensed reset drain current in place of the low-frequency components of the synchronous detector (or correlated double sampler) output response would be advantageous from the standpoint of eliminating low-frequency fixed-pattern noise problems. Since the synchronous detection and correlated double sampling schemes are relatively free of 1/f noise, as well as is reset drain current sensing, and since the spurious low frequency components extend only into the tens of kilocycles, the cross-over frequency between reset drain current sensing and the other CCD imager output signal can be set lower than was the practice in the Bendell and Levine technique.

Making the other CCD imager output signal, which crosses-over with the sensed reset drain current, to be the synchronous detector output response or correlated double sampler output response, rather than the baseband component of the floating-element electrometer response, is advantageous in that reset noise can be suppressed. The synchronous detection procedure that suppresses reset noise may be carried out as taught in either of the previously mentioned Levine patent applications, for example.

SUMMARY OF THE INVENTION

The invention is embodied in a solid-state imager, which has a CCD output register having separate means for obtaining low-frequency video response and high-frequency video response therefrom, wherein the low-frequency response is obtained by sensing drain current in the output CCD line register, and wherein the high-frequency response is obtained from sampling wideband the response of a floating-element electrometer sensing charge packets subsequently transferred to the output CCD line register reset drain. The high-frequency response is obtained from the electrometer output signal after correlated double sampling or after synchronous demodulation at a harmonic of output CCD line register clocking rate, for example.

DETAILED DESCRIPTION

Figure 1:
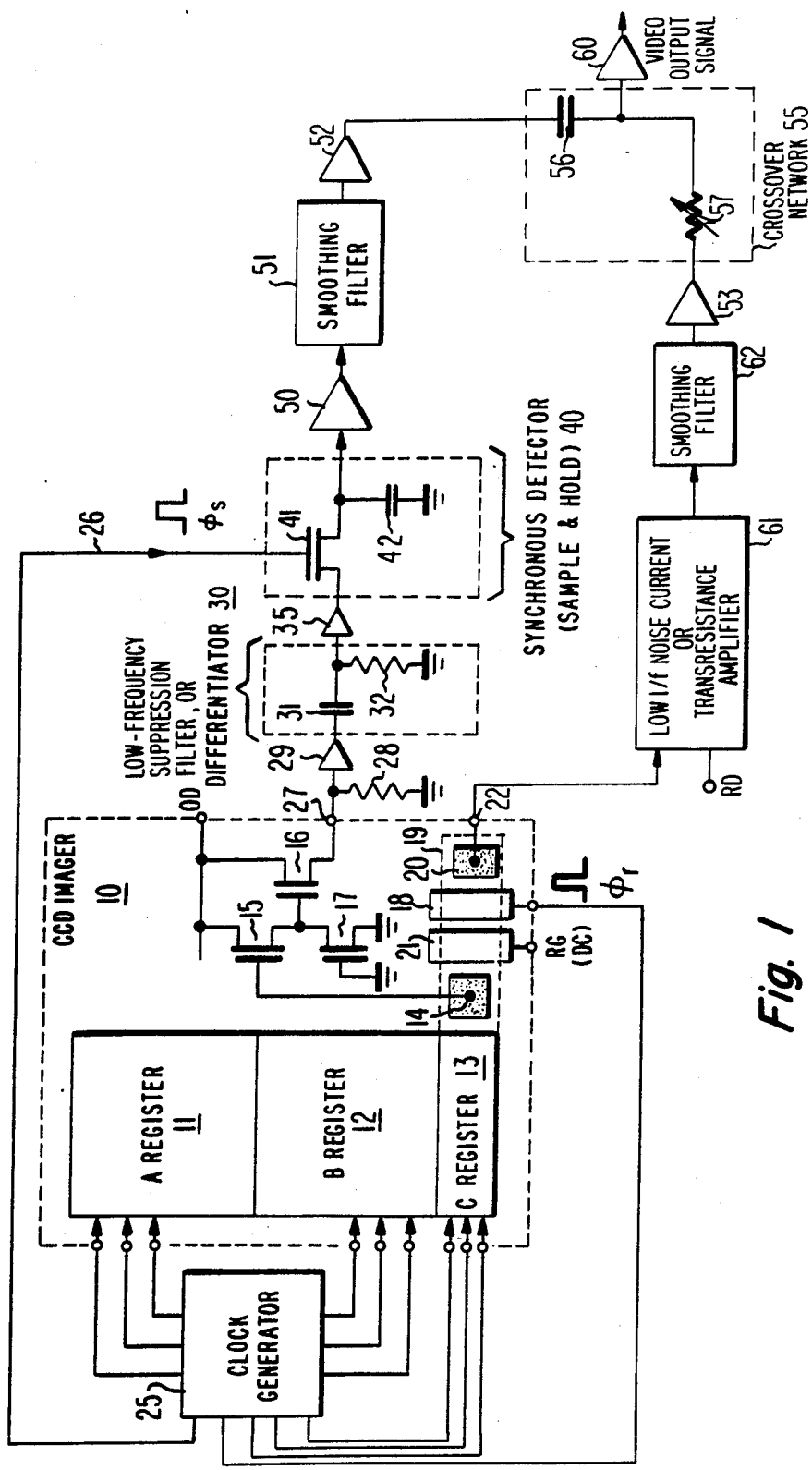
FIG. 1 is a schematic diagram of a CCD imager associated with circuitry for generating an output video signal in accordance with the invention, which circuitry includes a synchronous detector.

In FIG. 1 the signal recovery system of the invention is shown being used with a semiconductor imager which by way of example is a CCD imager 10 of field transfer type. CCD imager 10 includes per convention an image (or A) register 11, a field storage (or B) register 12, and a parallel-input-serial-output (or C) register 13. Output signal samples are generated from the charge packets transferred to the right end of C register 13, using a floating-element type of charge-to-voltage conversion stage. A floating-diffusion type of charge-to-voltage conversion stage is shown, by way of example, in in the drawing. In such a conversion stage charge packets are regularly clocked forward from the output of C register 13 and to floating diffusion 14, and the magnitude of charge in each packet is then determined by an electrometer comprising a cascade connection of source-follower metal-insulator-semiconductor field effect transistors 15 and 16. A further MISFET 17 is connected as a constant-current-generator source load for MISFET 15, and MISFET 16 is provided a source load by off-chip resistor 28 across which the CCD imager 10 output signal samples appear. A direct potential OD is applied to the drains of MISFET's 15 and 16 to condition them for source-follower operation. The source of MISFET 16 connects to the output signal terminal 27 of CCD imager 10 and thence through an external source load resistor 28 to a ground connection.

Output signal samples supplied at the output terminal 27 of CCD imager 10 are applied to the input connection of a low-noise voltage amplifier 29. The output connection of amplifier 29 supplies input signal samples to a differentiator 30, buffering source-follower MISFET 16 from the loading of the input connection of differentiator 30. Amplifier 29 preferably has a bandwidth sufficiently restricted to roll off higher video frequencies somewhat. Then the subsequent differentiation with respect to time of video signal samples, which takes place in differentiator 30, responds to the signal transitions having lowered slew rate to generate pulses stretched in time, and does not introduce into final response excessive-amplitude spikes owing to clocking signal feedthrough. The differentiated-with-respect-to-time video response of differentiator 30 is supplied as input signal to a wide-band-low-noise amplifier 35.

After each charge packet is measured, the potential on floating diffusion 14 as applied to the gate of MISFET 15 is reset responsive to a $\phi_r$ pulse applied to a reset gate 18. This pulse conventionally is somewhat narrower than the clocking pulse applied to the last clocked gate (not specifically shown) of a C register 13 and can be disposed to occur between the times that clocking pulse appears. Reset gate 18 is disposed "over" a charge transfer channel 19 extending through the C register 13 and beyond to include floating diffusion 14 and a terminal drain diffusion 20. More particularly, reset gate 18 is disposed "over" charge transfer channel 19 between floating diffusion 14 and terminal drain diffusion 20 and is preceded by a d-c gate 21, to which gate 21 a direct potential RG is applied. D-C gate 21 is preferably a short gate to reduce the amount of stored charge thereunder and is used to prevent the $\phi_r$ pulses applied to reset gate 18 from electrostatically coupling to floating diffusion 14.

A clock generator 25 is shown in FIG. 1 supplying respective sets of three-phase clocking signals to A register 11, to B register 12 and to C register 13, as is customary for a CCD imager of field transfer type. Any of other well-known clocking schemes could be used instead. Clock generator 25 generates $\phi_r$ pulses as described above, for application to gate electrode 18 of the floating-diffusion output stage. Clock generator 25 also supplies $\phi_s$ pulses, at a repetition rate equal to the clocking frequency of C register 13 during serial line readout, which $\phi_s$ pulses are applied via a line 26 to a synchronous detector 40. The $\phi_s$ pulses are used as carrier for controlling the times that signal supplied to synchronous detector 40 from the output connection of wideband low-noise amplifier 35 is sampled in the synchronous detection process. Amplifier 35 provides voltage gain which raises signal level such that its accompanying noise is larger than that introduced by the synchronous detection process to follow; with careful design the noise attributable to amplifier 35 is negligible compared to the 1/f noise generated within CCD imager 10.

Differentiator or low-frequency suppression filter 30 is shown in FIG. 1 as a simple RC high-pass filter comprising a series-arm capacitor 31 and a shuntleg resistor 32. The RC time constant $\tau$ is chosen so at least as much of the baseband of the frequency spectrum of the CCD imager 10 output samples as are accompanied by flicker or "1/f" noise substantially large as compared to background thermal noise is suppressed in the output response of differentiator 30 supplied to a synchronous detector 40. The time constant $\tau$ is the reciprocal of a corner frequency $f_c$, as expressed in radians per second, amplitude components at which frequency $f_c$ are suppressed 3 dB by filter 30. Frequency $f_c$ may be considered as a frequency of demarcation between substantial suppression and substantial non-suppression of frequencies present in the input signal of differentiator 30, but only selectively present in its output signal.

A 430 picofarad capacitor 31 and a 75-ohm resistor 32 has been used by the present inventor in a signal recovery system with a 7.5 MHz C register 13 clocking frequency. The RC high-pass filter has a thirty-five nanosecond time constant, or $\tau$, providing for a 5 MHz corner frequency, so the upper frequencies of the baseband spectrum of CCD imager 10 output samples combine with the demodulated first harmonic spectrum in the synchronous detector 40 output signal to provide video high-frequency peaking. (The baseband signal remnants and the demodulated first-harmonic-spectrum signal are correlated and add algebraically, while the noise components from the respective bands are uncorrelated and add vectorially. So signal-to-noise advantages accrue with this form of video high-frequency peaking.)

The use of synchronous detector 40 to generate a video signal response to the imager 10 output signal samples obtained by a floating-diffusion electrometer provides a video signal response that is up to 15 dB less noisy for higher-frequency video frequencies than the video signal response that can be obtained proceeding from imager 10 output signal samples obtained from the terminal drain connection 22 of its output line register 13. One can use switching demodulators followed by low-pass filtering for synchronous detection in accordance with the invention. However, such synchronous detectors perform average detection, in which the recovered baseband is accompanied by strong harmonic spectra. It is preferable to use a sample-and-hold type of synchronous detection process, to reduce the strength of the harmonic spectra remnant from the detection process relative to the recovered base-band spectrum.

FIG. 1 shows a simple sample-and-hold circuit 40 comprising the selectively conductive channel of a MISFET 41 with which to sample and a capacitor 42 with which to hold the sample. The gate of MISFET 41 receives from line 26 the $\phi_s$ pulses supplied at a rate equal to C register clocking frequency, and its channel is selectively rendered conductive responsive to the $\phi_s$ pulses. MISFET 41 is operative, then, as a transmission gate of a type in which control signals ($\phi_s$ pulses from line 26) do not feed through to any appreciable extent to the selectively conductive channel. The output circuit of this form of synchronous detector is not balanced with respect to input signals supplied to the selectively conductive channel. The baseband spectrum applied to the input of this synchronous detector appears at its output, which accommodates the video high-frequency peaking scheme referred to previously.

The detected output signal from sample-and-hold circuit 40, unlike that taken directly from a switching demodulator, is a usable video signal with no need for filtering beyond that afforded by video amplifier cut-off. Detected output signal is shown in FIG. 1 as being applied to a buffer amplifier 50 and thence to a smoothing filter 51. Filter 51 is preferably a low-pass filter that removes clocking frequency remnants so as to supply a low-noise video signal that is also free of aliasing on image details. The low-pass filtering provided by smoothing filter 51 has a cut-off frequency near the C register Nyquist rate, so as to pass a complete video frequency spectrum while cutting off clocking frequency remnants. The response from smoothing filter 51 is shown in FIG. 1 as being applied as input signal to a further buffer amplifier 52. Buffer amplifier 52 provides a low output impedance drive to the high-frequency input circuit of a cross-over network 55.

Cross-over network 55 comprises a capacitor 56 for applying the high-frequency components of buffer amplifier 52 output signal to the input connection of another buffer amplifier 60 from which the video output signal is finally taken. Cross-over network 55 further comprises a resistive element 57, shown as having an adjustable resistance, for applying the low-frequency component of the output response of a buffer amplifier 53 to the input connection of buffer amplifier 60. The input impedance of buffer amplifier 60 is large, so as not to affect the cross-over frequency of cross-over network 55, as established by the resistance of element 57 and the capacitance of capacitor 56.

Consider now the derivation of the input signal applied to buffer amplifier 53. (The low-frequency component of the output signal of the buffer amplifier 53 applied to the second input connection of cross-over network 55 is amplified by buffer amplifier 60 to form the low-frequency component of the video output signal supplied by buffer amplifier 60.) Rather than applying the direct potential RD directly to imager 10 terminal 22 and thence to terminal drain diffusion 20, it is applied via the "short-circuit" input impedance of a low-flicker-noise current or transresistance amplifier 61. Amplifier 61 develops an output response to the current flowing through terminal 22 as each charge packet is drained away from under floating diffusion 14 through terminal drain diffusion 20, terminal 22 and the input impedance of amplifier 61 to the RD potential supply. This response is smoothed to form a continuous video signal in a smoothing filter 62. This continuous video signal has little, if any, spurious low-frequency components and is applied as input signal to buffer amplifier 53. The gains of amplifiers 29, 35, 50, 52 and of amplifiers 61, 53 are so chosen that the amplitudes of the input signals to cross-over network 55 in the frequencies near cross-over are substantially equal, when it is desired to have amplifier 60 video output signal have flat frequency response through the cross-over region. Smoothing filter 62 preferably has the same cut-off characteristics so the amplitudes of the input signals to cross-over network 55 are substantially the same in the cross-over frequency region. Some delay compensation (not shown) may have to be provided so filter 62 response lags filter 61 response by the desired ninety degrees at cross-over.

Since neither the video signal generated by synchronous detector 40 nor the video signal developed by smoothing the output response of amplifier 61 in filter 62 has appreciable 1/f noise associated therewith, the cross-over frequency in cross-over network 55 can be chosen lower than in the U.S. Pat. No. 4,435,730 circuit. A cross-over frequency of five to ten times the line frequency will suppress the undesirable low-frequency shading components under any conditions of imager operation and will allow amplifier 61 to be made with narrower bandwidth.

Figure 2:
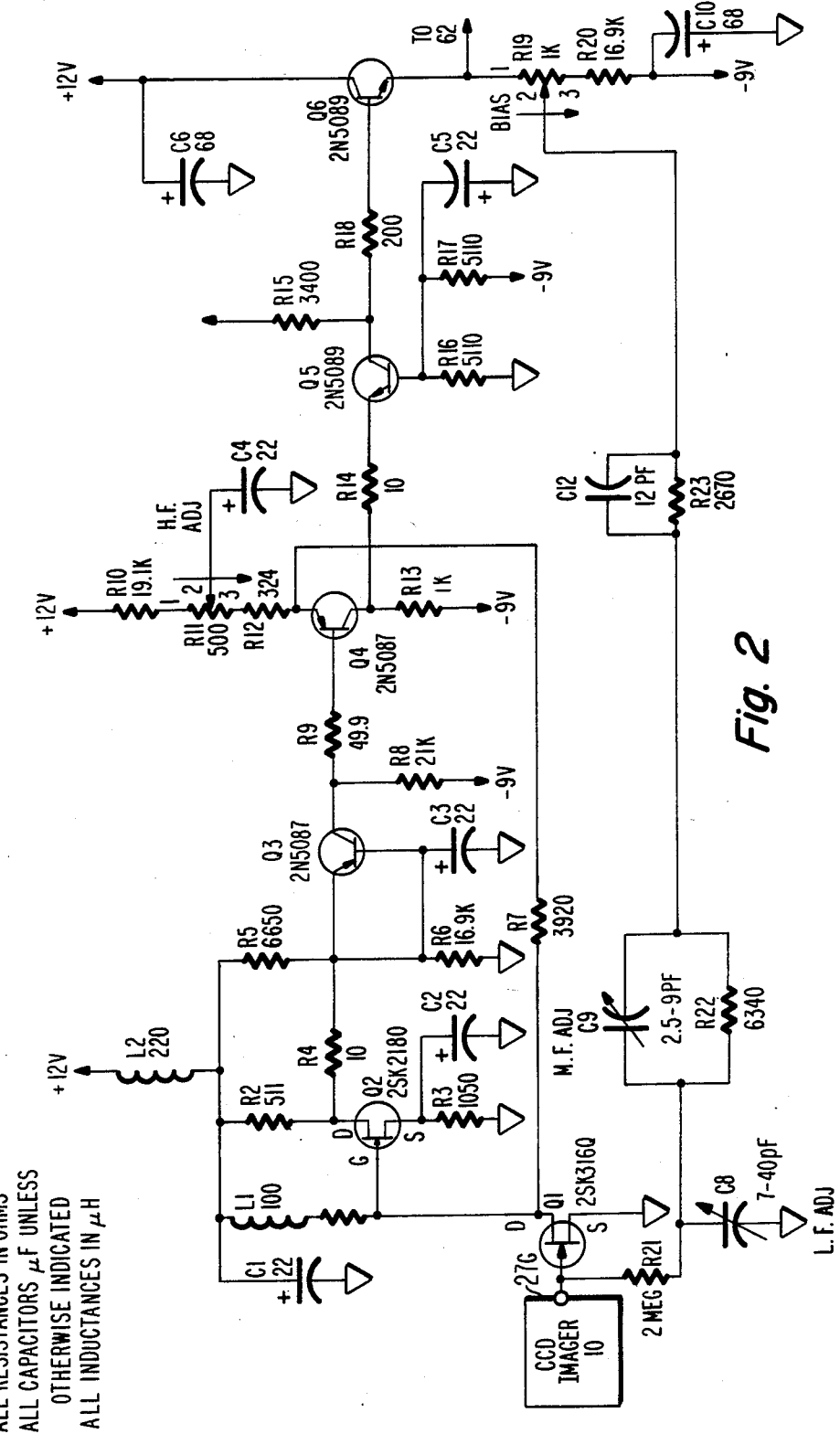
FIG. 2 is a schematic diagram of a low-flicker-noise transresistance amplifier, known per se, which is suitable for use in the circuitry for generating an output video signal in accordance with the invention.

FIG. 2 is a schematic diagram of a lower-flicker-noise transresistance amplifier found in RCA Corporation camera equipment. This amplifier has been successfully used in the U.S. Pat. No. 4,435,730 circuit and is applicable for use in the present invention. This transresistance amplifier has 5 MHz bandwidth.

Figure 3:
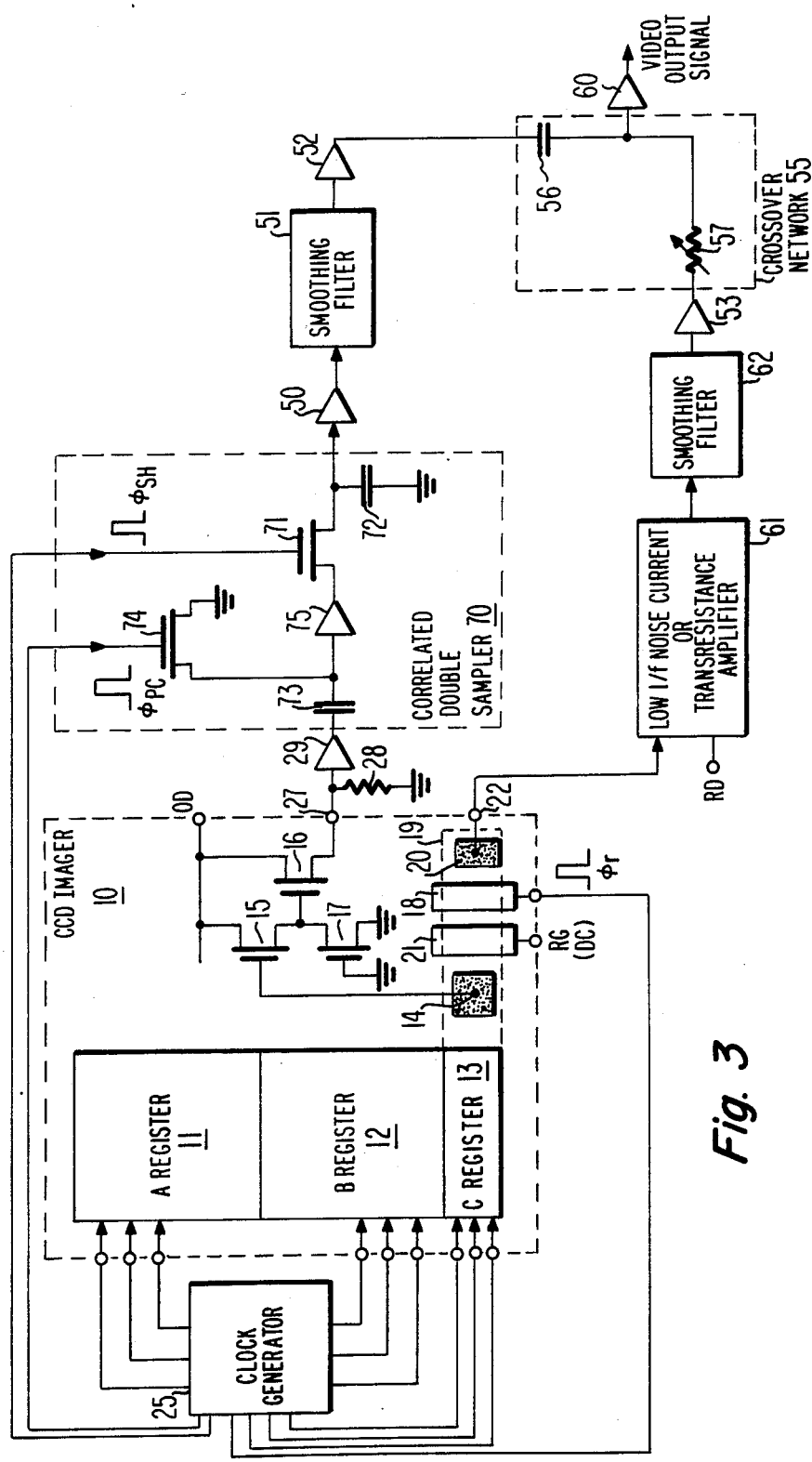
FIG. 3 is a schematic diagram of a CCD imager associated with circuitry for generating an output video signal in accordance with the invention, which circuitry employs correlated double sampling.

The FIG. 3 signal recovery system is similar to that of FIG. 1 except for the means for recovering signal from terminal 27 of CCD imager 10. Differentiator 30 and synchronous detector 40 are replaced by a correlated double sampler 70. Correlated double sampler 70 includes a sample-and-hold circuit, with MISFET 71 used as a sample switch and with a hold capacitor 72. Correlated double sampler 70 further includes a dc-restorer circuit, with a dc-blocking capacitor 73 and a MISFET 74 used as a keyed clamp, following the buffer amplifier 29. A buffer amplifier 75 is interposed between the dc-restorer and the sample-and-hold circuits.

Clock generator 25 supplies a pulse $\phi_{PC}$ to the gate electrode of MISFET 74 to drive its channel into conduction to clamp the input of buffer amplifier 75 to signal ground, following each $\phi_r$ reset pulse, but before charge is again admitted to the floating diffusion 18. This performs a dc restoration responsive to the reset noise level, placing charge on dc-blocking capacitor 73 to maintain a voltage thereacross which will compensate against reset noise accompanying the response to the charge next admitted to floating diffusion 18. After the $\phi_{PC}$ pulse, when MISFET 74 no longer maintains clamp, C register 13 clocks a charge packet to floating diffusion 18. Electrometer response to this charge packet after charge transfer to floating diffusion 14 is completed is amplified in voltage by amplifier 29, passed through capacitor 73 and amplified by buffer amplifier 71 to be sampled to hold capacitor 72 by conduction of MISFET 71 responsive to a $\phi_{SH}$ pulse supplied to its gate electrode from clocking generator 25. The sample-and-hold operation places the response to the charge packet, any remnant reset noise and the 1/f noise generated in amplifier 29 on equal duty cycle to improve the signal-to-noise ratio for 1/f noise (and for any remnant reset noise, as well).

Correlated double sampler 70 exhibits low-frequency fixed-pattern shading, which is suppressed along with other low-frequency content in cross-over network 55. The remaining high-frequency content of correlated double sampler 70 output response is augmented in cross-over network 55 by low-frequency response to the current flowing through reset drain 22, analogous to operation in the FIG. 1 embodiment of the invention.

The FIG. 1 or FIG. 3 circuitry may be modified where amplifier 61 is a transresistance amplifier with suitably low output impedance, to supply cross-over network 55 input signals from buffer amplifier 50 and amplifier 61 outputs rather than from the outputs of buffer amplifiers 52 and 53. Buffer amplifiers 52 and 53 are then dispensed with. So are smoothing filters 51 and 52, to be replaced by a signal smoothing filter in cascade with buffer amplifier 60 after cross-over network 55. A number of other variants of the preferred embodiment which utilize the tenets of the invention are readily conceivable by one skilled in the art and acquainted with the foregoing disclosure; this should be done in mind when considering the scope of the following claims.

What is claimed is:

1. In combination with a solid-state imager having an output charge-coupled device charge transfer channel clocked at a prescribed clock rate, having a floating element electrometer for sensing charge at a point in said charge transfer channel to supply a first signal at a first electrical output, and having a terminal drain at the end of said charge transfer channel for supplying a further signal at a second electrical output, circuitry for generating an output video signal responsive to the signals at said first and second electrical outputs comprising:

means for deriving the high-frequency portion of said output video signal, said deriving means including means coupled to said first electrical output for providing wide-band multiple sampling of the video information portion of said first signal, which wide-band sampling is associated with the generation of undesirable low-frequency-fixed pattern shading;

means for deriving the low-frequency portion of said output video signal from said further signal at said second electrical output; and means for combining the low-frequency and high-frequency portions of said output video signal into a continuous-frequency-spectrum signal.

2. In combination with a solid-state imager having an output charge-coupled device charge transfer channel clocked at a prescribed clock rate, having a floating element electrometer for sensing charge at a point in said charge transfer channel to supply a first electrical output signal, and having a terminal drain at the end of said charge transfer channel for supplying a second output signal, circuitry for generating an output video signal responsive to said first and second electrical signals comprising:

means for deriving the high-frequency portion of said output video signal from said first electrical output signal after wide-band sampling thereof, which wide-band sampling is associated with the generation of undesirable low-frequency-fixed pattern shading;

means for deriving the low-frequency portion of said output video signal from said second electrical output signal;

means for combining the low-frequency and high-frequency portions of said output video signal into a continuous-frequency-spectrum signal; and said means for deriving the high-frequency portion of said output signal includes:

a low-frequency-suppresion filter, with an input connection receptive of said first electrical output signal from said solid-state imager, and with an output connection; and a synchronous detector having an input connection from the output connection of said low-frequency-suppression filter, performing said wide-band sampling at a harmonic of said prescribed clock rate, and having an output connection; and a filter separating the high-frequency portion of response at the output connection of said synchronous detector, for application to said means for combining.

3. In combination with a solid-state imager having an output charge-coupled device charge transfer channel clocked at a prescribed clock rate, having a floating element electrometer for sensing charge at a point in said charge transfer channel to supply a first electrical output signal, and having a terminal drain at the end of said charge transfer channel for supplying a second output signal, circuitry for generating an output video signal responsive to said first and second electrical signals comprising:

means for deriving the high-frequency portion of said output video signal from said first electrical output signal after wide-band sampling thereof, which wide-band sampling is associated with the generation of undesirable low-frequency-fixed pattern shading;

means for deriving the low-frequency portion of said output video signal from said second electrical output signal;

means for combining the low-frequency and high-frequency portions of said output video signal into a continuous-frequency-spectrum signal; and said means for deriving the high-frequency portion of said output signal includes:

correlated double sampling apparatus for wide-band sampling said first electrical output signal from said solid-state imager; and a filter separating the high-frequency portion of the correlated double sampled first electrical output signal, for application to said means for combining.

* * * * *